(12) United States Patent
Angelin et al.

(10) Patent No.: US 7,146,342 B1
(45) Date of Patent: Dec. 5, 2006

(54) PAYMENT SYSTEM AND METHOD FOR USE IN AN ELECTRONIC COMMERCE SYSTEM

(75) Inventors: Lars Angelin, Karlskrona (SE); Christian Allfred, Karlskrona (SE); Luiz Otavio Carvalhal, Karlskrona (SE); Andreas Undhagen, Karlskrona (SE); Lars Haraldsson, Ronneby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 323 days.

(21) Appl. No.: 09/718,411

(22) Filed: Nov. 24, 2000

(30) Foreign Application Priority Data

Nov. 23, 1999 (SE) .................................... 9904258

(51) Int. Cl.
*G06F 17/60* (2006.01)

(52) U.S. Cl. ................ 705/76; 705/1; 705/14; 705/16; 705/17; 705/26; 705/27; 705/35; 705/38; 705/39; 705/40; 705/41; 705/42; 705/44; 705/65; 705/75; 705/77; 705/78; 705/79; 705/80; 705/64; 705/66; 705/67; 235/379; 235/380; 235/381; 235/487; 380/30

(58) Field of Classification Search ............ 705/51–59, 705/74–79, 1, 14, 16, 17, 26, 27, 35, 38–44, 705/64–67, 75–80; 235/379–381, 487; 380/30
See application file for complete search history.

(56) References Cited

U.S. PATENT DOCUMENTS

| | | | |
|---|---|---|---|
| 5,557,518 A | 9/1996 | Rosen | |
| 5,671,280 A * | 9/1997 | Rosen | 705/67 |
| 5,677,955 A | 10/1997 | Doggett et al. | |
| 5,897,621 A | 4/1999 | Boesch et al. | |
| 5,903,652 A | 5/1999 | Mital | |
| 6,029,150 A | 2/2000 | Kravitz | |
| 6,047,270 A * | 4/2000 | Joao et al. | 705/44 |
| 6,055,314 A * | 4/2000 | Spies et al. | 380/228 |
| 6,119,227 A * | 9/2000 | Mao | 713/171 |
| 6,223,291 B1 * | 4/2001 | Puhl et al. | 713/201 |

FOREIGN PATENT DOCUMENTS

| | | |
|---|---|---|
| EP | 0 858 057 A2 | 8/1998 |
| JP | 0 858 057 A2 * | 12/1998 |
| WO | 99/49404 A1 | 9/1999 |
| WO | 99/52042 A1 | 10/1999 |

OTHER PUBLICATIONS

Open Buying on the Internet (OBI) TM, Technical Specifications Release V2.0, published Mar. 1999, pp. 9-13. Retrieved from IDS.*
Open Buying on the Internet (OBI) TM, Technical Specifications retrieved from www.openbuy.org, Release V2.0, published Mar. 1999, pp. 9-13.

* cited by examiner

*Primary Examiner*—James A Reagan
(74) *Attorney, Agent, or Firm*—Nixon & Vanderhye P.C.

(57) ABSTRACT

A method and system of payment of goods and services in an electronic commerce system reduces the transfer and processing costs for each purchase made by a customer from a merchant. A customer agent, a merchant agent, and account manager associated with the agents administer customer accounts and merchant accounts. A mediating trusted agent associated with one of the account managers and merchant agent transactions during a trading session. The customer agent and merchant agent, the account manager, and the mediating trusted agent are interconnected by an electronic communication network.

25 Claims, 3 Drawing Sheets

PAYMENT SYSTEM AND METHOD FOR USE IN AN ELECTRONIC COMMERCE SYSTEM

FIELD OF THE INVENTION

The present invention relates to a payment system and method for an electronic commerce system, and more particularly to a payment system and method utilising at least a customer agent and a merchant agent, at least an account manager associated with said agents for administration of customer accounts and merchant accounts, and at least a mediating trusted agent associated with said at least one account manager and merchant agent for checking transactions, for purchases made by a customer from a merchant.

BACKGROUND OF THE INVENTION

There are different kinds of electronic commerce systems and associated payment systems. Some existing systems provide only handling of payments, i.e., so called payment systems, some systems provide full transaction services, and other systems provide some transaction services together with payment services.

Transactions and payments in such electronic commerce systems are performed over a communication network such as the public switched telephone network, cellular phone systems, the Internet, or an intranet etc. Small payment transactions are denoted micro-payments. The goods, such as documents, pictures, software, stock market information, etc., are purchased by a customer via a webbrowser from a merchant over the Internet.

Crucial for all existing micro-payment schemes is a very low transaction cost, i.e., the transaction cost must be at least a magnitude smaller than the price of the goods. The low prices of the goods imply a lower expectation of the security level compared to "full" price systems.

Further, other requirements on payment systems include low price, fast and reliable transfer, and to provide customer integrity.

For every transaction, money has to be transferred from a customer account to a merchant account. Micro payment may be considered as one transaction per merchant site while as a plurality of transactions in other cases. The current business model for micro payments is still not well understood, and different solutions aim for different models.

There are two basic concepts and a number of different solutions for each concept on the market. On the one hand, DigiCash, CyberCoin and Millicent are well-known digital cash solutions representing the first concept. On the other hand, IBM's MiniPay is an account based solution, wherein real money is transferred between different accounts, representing the second concept. The MiniPay is a lightweight system and probably quite cheap regarding operating costs, and it is user-friendly.

A general description of a prior art account based system is described with reference to FIG. 1. According to a generic payment system as shown in FIG. 1, a merchant 100 displays the goods for sale, e.g., on a web page, at step 0. A customer 101 orders goods at step 1. At step 2, the customer 101 sends a payment order to its account manager 102. The payment is transferred to a value acquirer 103 at step 3. The merchant 100 is notified of the payment completion by the value acquirer 102 at step 4, and the goods are finally delivered.

A micro-payment system such as the IBM MiniPay system includes a plurality of necessary features in order to operate properly. When a purchasable item is presented on a customer's browser, the Minipay provides desired click and pay features for the order and payment of the goods. Further, an easy way for establishment of the link between the goods and the payment system, and the use of the system from the customer's as well as the merchant's point of view has to be provided. The usefulness of the payment system increases if it is adaptable to several accounting systems like Telco's billing systems and banking accounts. It must be possible to do business in multi-operator environment. The system must be scalable, i.e., adaptable for a few users as well as for millions of users with costs growing not more than linearly. For the purpose of distribution, the system has to run on standard hardware, such as PCs and workstations. The value of the goods for sale in a micro-payment environment is quite low and, consequently, the security measures should be in harmony with these values. Micro payment systems have to provide limited information volume and processing overheads for the transactions. Among the required processing tasks are customer authentication, authorization, and currency exchange rate calculations. Most of the above mentioned features are solved by the MiniPay system.

However, a problem with the MiniPay system and other payment systems is the problem of interoperator transactions, and complex clearing procedures of transactions within an operator and between operators.

Another problem is that prior art payment systems only support a single or a pair of currencies, and it is not possible to add new currencies. A consumer expects to buy from merchants scattered around the globe. Thus, there is minimal chance that a consumer buys a product from a merchant using the same currency as in its own country. As much as a consumer expects to pay in its own currency, a merchant expects to be paid in its own.

A main problem in digital cash systems and in some account based systems is double spending, which occurs when customers are involved in several transactions simultaneously. Customer integrity is a further problem in electronic commerce systems, i.e., merchants can utilise customer consumption patterns in undesired ways. Authentication, authorisation of the customer, and the handling of encryption keys are important features in a payment system.

PKI (Public Key Infrastructure) is a system(s) using certificates or electronic ID cards for obtaining secure transactions and customer integrity. Certificates exist in various formats and flavours, such as the X.509 standard.

One of the most difficult items in electronic commerce today is how to secure the transportation of digital goods between trading parties. There are several aspects where it might be an advantage to have a mechanism that can protect the involved parties both from a legal and a reliability perspective. Usually, today's trading/payment schemes do not cover this at all, or badly.

Three major problems can be identified as blockers for trading with digital goods over the Internet:

1. Acceptance of Delivery

The consumer does not have sufficient tools to handle acceptance of delivery in case of digital goods. Most often, merchandise has to be accepted as it arrives through the Internet to the consumer's computer. There are no legal possibilities to complain if it was erroneous or completely wrong.

2. Fraudulent Consumers/Non-Repudiation

The merchants on the Internet do not have enough or easy tools to prohibit fraudulent consumers from ordering goods that they do not want to pay for. The merchant cannot know if the goods reached the consumer or not.

3. Unauthorized Access of Goods

In some trading situations, either the consumer or the merchant (sometimes both) does not want to reveal the good for any outsiders. Within the Internet environment, it will always be possible to catch plain text information between two parties.

SUMMARY OF THE INVENTION

It is an object of the present invention to provide an improved electronic payment system for use in an electronic commerce system and a method thereof, which reduces the transfer and processing costs for each purchase by a customer from a merchant in the commerce system.

Another object of the present invention is to provide a payment system not disclosing the customer's identity during a trading session.

It is still another object of the present invention to provide secure transactions between a customer and a merchant in order to protect the customer's accounts and its account manager from abuse.

It is a further object of the present invention to prevent double spending of the customer.

It is yet another object of the invention to provide and reduce the authentication procedure to a minimum.

It is still a further object of the present invention to provide a payment system adaptable to several accounting systems.

A further object of the present invention is to enable interoperator transactions.

Another objective is to guarantee the payment to the merchant.

Another object is to provide the customer with spending control.

Still another object of the present invention is to provide a scalable payment system.

Yet another object of the present invention is to support a plurality of currencies.

These objects are accomplished by a payment system and method according to the invention as claimed.

A more specific object of the invention is to provide a method for secure delivery of electronic products over a communications network.

BRIEF DESCRIPTION OF THE DRAWINGS

In order to explain the invention in more detail and the advantages and features of the invention a preferred embodiment will be described in detail below, reference being made to the accompanying drawings, in which.

DETAILED DESCRIPTION

Figure 1:
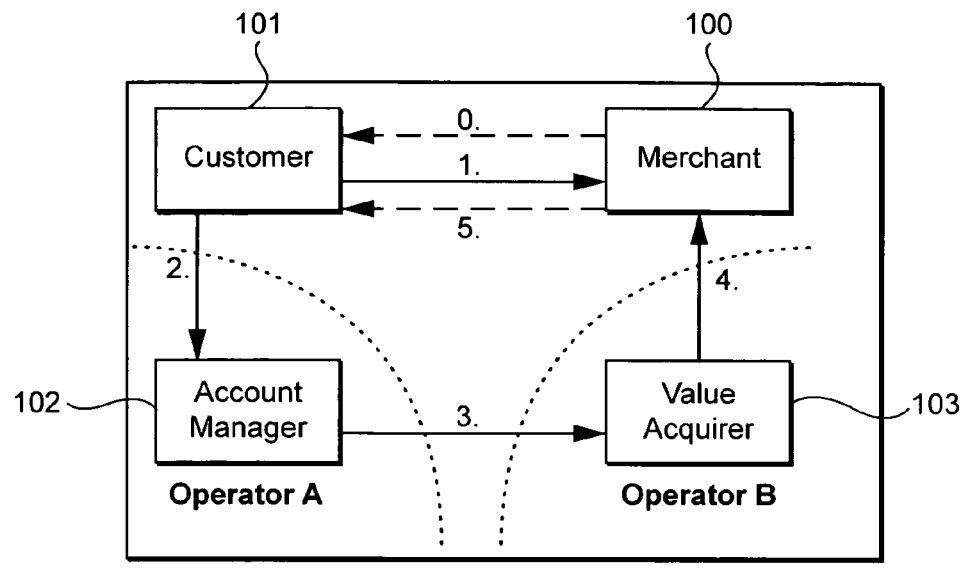
FIG. 1 is a block diagram showing a network configuration of a prior art electronic payment system for use in electronic commerce.
Figure 2:
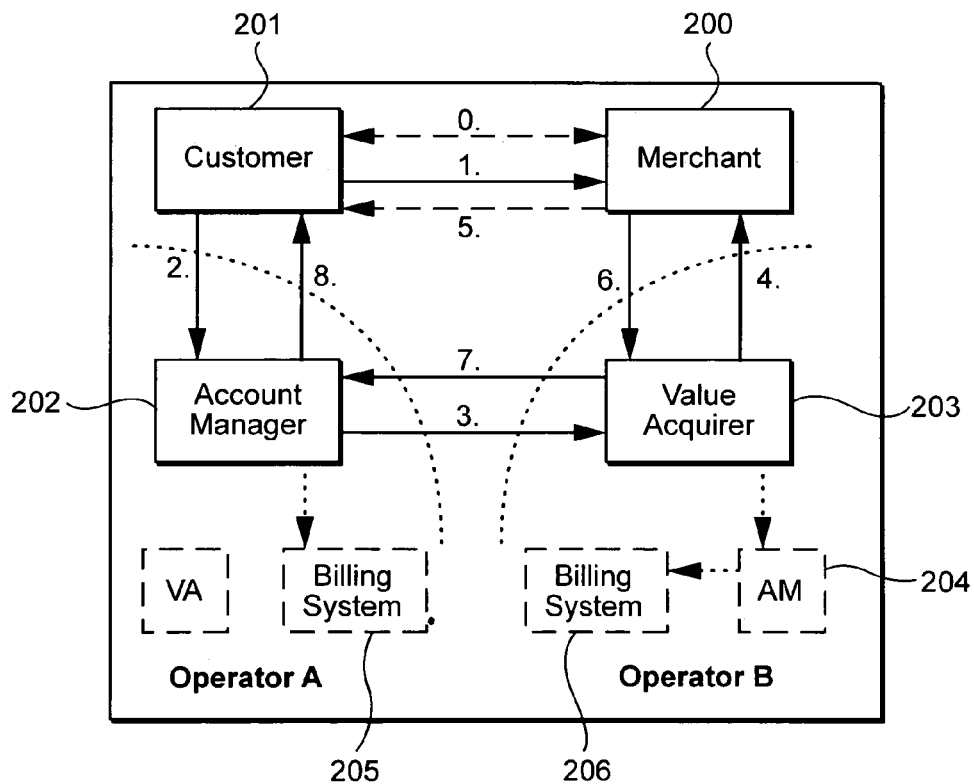
FIG. 2 is a block diagram showing a network configuration of an electronic payment system according to the invention for use in electronic commerce, illustrating the initiation and continuation of a trading session.
Figure 3:
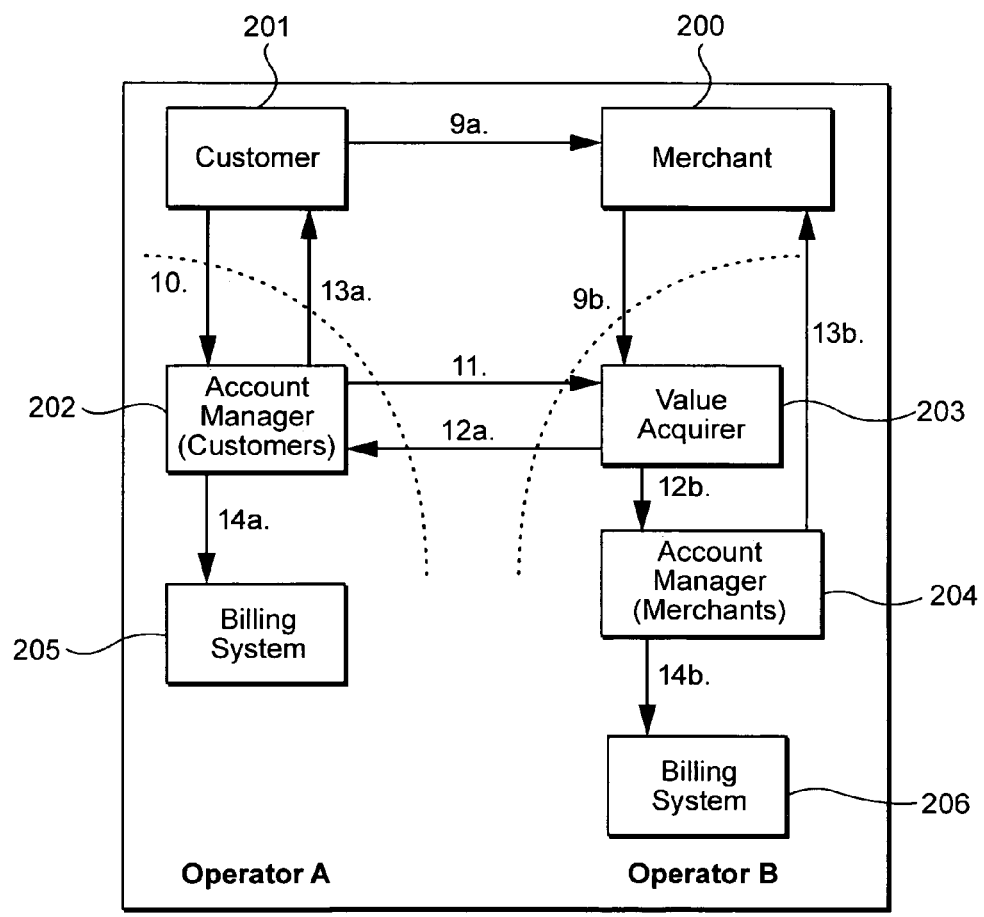
FIG. 3 is a block diagram showing a network configuration of an electronic payment system according to the invention for use in electronic commerce, illustrating the conclusion of the trading session.

With reference to FIGS. 2 and 3, a payment system for use in an electronic commerce system for reducing the transfer and processing costs for each purchase made by a customer or consumer from a merchant, comprises at least a merchant agent 200, such as a server or computer system operated by a merchant, a customer agent 201, such as a PC, PDA, Mobile or workstation operated by a customer, at least an account manager 202 provided by an operator associated with said agents for administration of customer accounts and merchant accounts, and at least a mediating trusted agent or a so called value acquirer 203 provided by the operator or another operator associated with the at least one account manager 202 and merchant agent 200 for checking transactions during a trading session.

The customer agent(s) 201 and merchant agent(s) 200, the account manager(s) 202, and the mediating trusted agent(s) 203 are interconnected by for example an electronic communication network, such as the Internet, an intranet, a public switched telephone network, and/or a mobile telephone network, an optical network, or a combination thereof, or another kind of communication network.

The main function of the account manager 202 is to administer the customer accounts and trading records, and to create and forward billing records to external billing systems, such as banks, telecommunication operators, credit card firms etc. A merchant or the merchant agent is associated like customers to the account manager 202; the difference is in the relation to the mediating trusted agent 203.

The mediating trusted agent or value acquirer 203 is a part of the payment system of the merchant's operator. The function of the value acquirer 203 is to handle a deposit, described later, check the transaction records when trading sessions are terminated, and deliver the transaction records to the appropriate account managers of the customer and merchant, respectively.

A relation between a customer 201 and an account manager 202 when the customer is logged-on to the account manager is denoted a session. Each session is given an identity generated by the account manager 202 according to the following illustrative pseudo code expression:

Sessionidentity=AccountManagerIdentity.Sequencenumber 1

The SessionIdentity is valid through the complete session.

A relation between a customer agent 201 and a merchant agent 200 when the customer orders goods is denoted a transaction. Each transaction is given an identity when it is generated by the account manager 202 according to the following pseudo expression.

TransactionIdentity=SessionIdentity.Sequencenumber2

The TransactionIdentity is generated by the account manager 202 when the customer agent 201 informs about a purchase. Further, the TransactionIdentity is valid through the complete transaction.

A method of payment of goods in an electronic commerce system according to the invention is divided into two phases: an initiation phase illustrated in FIG. 2, including steps regarding the initiation and continuation of a trading session; and a conclusion phase illustrated in FIG. 3, including steps regarding the conclusion of a trading session.

In the following description, the payment system is only partly disclosed. Some well-known features such as the initial contacts between a customer and a merchant and the registrations and other system entities are not described in detail so as not to make the present invention unclear.

All involved parties are given an asymmetric key pair at registration and algorithms like RSA or DSA are likely to be used. Further, all communication except between the customer and the merchant is carried out on secure channels like SSL or IPSec.

In the initiation phase, a normal GET URL message is used to download a web page and a normal response to the GET URL is performed at step 0, i.e., a web page with prices and information associated for proceeding with the transaction. The merchant agent 200 receives an order of goods/service from the customer agent 201. The customer account manager 202 receives an initiation message sent from the customer agent 201, wherein the message includes data for registration of the customer agent 201, and order information with the size of the purchase. The initiation message further comprises the amount of the deposit, a transaction identity, the identity of the merchant, and the identity of the merchant's operator for locating a proper mediating trusted agent 203.

Further, the customer account manager 202 provides the customer agent 201 with account data during a trading session being established between the customer agent 201 and the merchant agent 200 over the network. The customer account manager 202 amends and forwards the initiation message to the mediating trusted agent 203 for registration of the customer, and delivering of a deposit. The amended initiation message comprises the deposit in the customer currency, a customer identifier, the transaction identity, and the identity of the merchant.

The mediating trusted agent 203 sends an information message including the deposit to the merchant agent 200. The information message comprises the deposit in the currency of the merchant, a trading session identity, and the customer identifier. The trading session is now ready to start.

After the mediating trusted agent 203 has sent an information message, the merchant acknowledges the customer and the associated deposit to the mediating trusted agent 203. The mediating trusted agent 203 acknowledges the customer and the associated deposit to the customer account manager 202. The acknowledgement includes the current exchange rate, and the customer account manager 202 forwards the exchange rate to the customer agent 201. When the customer account manager 202 amends and forwards the initiation message to the mediating trusted agent 203, the customer is also vouched for.

When the value of at least one purchase is equal to or exceeds the value of the deposit, a clearing procedure is initiated by the merchant 200. If the deposit is consumed and a subsequent purchase attempt is made, it will be treated as an initial purchase attempt, and a new transaction is initiated. However, a plurality of purchase orders can be executed within the limit of a single deposit.

Additionally, the trading session can be stopped by instructions from the customer agent 201 or the merchant agent 202 or after a timer expiry, which may be agreed upon at the initiation. In order to stop or terminate the trading session, the merchant agent 200 receives a trading session terminate message sent by the customer agent 201 or a timeout.

During the conclusion phase, the customer account manager 202 receives a signed customer transaction record sent by the customer agent 201, the customer account manager 202 sends the customer transaction record to the mediating trusted agent 203, and the merchant agent 200 sends a signed merchant transaction record to the mediating trusted agent 203. The mediating trusted agent 203 compares and evaluates the transaction records, resulting in clearing information. The mediating trusted agent 203 sends the clearing information to the customer account manager 202 and a merchant account manager 204, respectively.

Finally, the customer account manager 202 and a merchant account manager 204, respectively, send the clearing information to the customer agent 201 and the merchant agent 200, in this example embodiment of the invention. This is, however, not necessary and can be optional. Based on the clearing information, the transaction records are processed to a withdrawal record and a deposit record, respectively, which are stored. The withdrawal record is sent to a customer billing system 205 and the deposit record is sent to a merchant billing system 206.

The trading session may comprise a number of single purchases, thereby reducing the transfer and processing costs for each purchase, as most of the required transfer and processing are performed at one instant for a large number of purchases. This is especially important for the costly chores, such as authentication/authorization and secure money transfer, but also for the currency exchange rate conversion.

In an alternative example embodiment of the invention, the method allows the consumer to receive a currency exchange table (together with a lifespan stamp) from her own bank and keep it stored on her device or terminal (PC). The application that enables transactions can then look for a local table in the consumer's device (PC) first and provide price information in her consumer's device in real time. The application can also alert the consumer if the validity of the table has expired or if no such table exists. If a valid table exists with the relevant currency value, it is used throughout the whole session.

Another important point is that it keeps the trust chain intact, i.e., a consumer is more likely to trust her own bank for currency exchanges than another bank it has no knowledge of. It would also avoid confusions that would come from a consumer buying products from merchants in the same foreign country and having to pay different prices in her own currency because the two merchants have different banks. The flow is as follows:

1. An offer is sent from a merchant to the consumer's device;
2. The device checks if a valid currency table exists (if not, the device contacts the bank and requests a valid currency table);
3. The offer is changed by the device before it is displayed so as to show the price in the consumer's currency;
4. The consumer decides to purchase the product. It sends a request to her financial institution including the amount of the deposit in her own currency;
5. The financial institution converts the deposit currency to the merchant's currency and forwards it to the merchant's financial institution;
6. When the shopping session ends, eventual money left unused is returned to the consumer's financial institution on the merchant's currency;
7. The consumer's financial institution converts the remainder of the deposit to the consumer's currency;
8. The session ends.

The customer identity is not disclosed by the payment system, not even to the trusted mediating agent. The merchant will only have access to a temporary customer identity and the customer public key, which is not traceable via the payment system. The merchant must of course know the IP address of the customer but one may assume that the customer has a dynamic IP address, and it is not traceable without some effort. The contents of the purchase(s) are hidden for the banks, i.e., the mediating trusted agent or the account manager, because the purchase list is encrypted. Only a hash of the purchase list is visible, so that the mediating trusted agent can compare and verify that the both lists received from the parties are equal. A hash cannot be reversed in order to receive the purchase list.

On the merchant side, both the merchant and the merchant's operator have secured their payment from the customer's side. In order to protect the customers account and the account manager from abuse, secure channels like SSL or IPSec are used with sufficient strength in the encryption algorithms and the associated keys. The same applies between the merchant and the mediating trusted agent.

Double spending is impossible since the account manager does not hand out deposits beyond its own credit limit for the customer.

The PKI(Private Key Infrastructure) is reduced to a minimum, because a customer/merchant needs only to know the public keys of its clients. The difficult part is the operator's knowledge of other operators' public key. Other knowledge of public keys is only temporary.

With PKI the consumer has a certificate it would show the merchant to ensure privacy, authentication, etc. This privacy is not privacy towards the merchant itself, who could keep track of your shopping patterns or other information on your certificate for future, sometimes malicious, use. Besides, from a merchant perspective, a certificate that the consumer presents should be vouched for by a common trusted party, which means many liaisons between many different customer agents around the world.

The solution assumes that the PKI infrastructure is placed in a particular topology. In the topology, 4 zones are identified:

Zone 1: Englobes Financial Institutions (FI) on permanent trust relationships. A common certificate authority (CA) issues FI certificates.

Zone 2: Englobes FIs and their customers on permanent trust relationships. The FI issues certificates.

Zone 3: Same as Zone 2. (since a customer/consumer and a merchant both are customers from the FI's point of view).

Zone 4: Non PKI ruled zone that exists during a shopping session

When a shopping session starts certificates should be exchanged between consumers and merchants. Since the certificates issuers are outside each other PKI zone, the FI will act as mediators in this exchange.

The consumer will ask its FI to prepare a temporary certificate on behalf of itself. The temporary certificate contains only the consumer's public key (and relevant cryptographic information) and a session ID (used to track the session data to the involved parties). The FI will sign it (using the certificate issued by the CA common to its and the merchants FI) and deliver it to the merchant's FI. The merchant's FI checks the signature for validity, decrypts the information, signs it (using the certificate issued by itself—trusted by its customer, the merchant) and forwards it to the merchant.

The merchant now possesses a cryptographic valid certificate that contains the necessary data to perform cryptographic enhanced operations without revealing the other party's identity.

The reversed process is initiated by the merchant to make its certificate available to the consumer.

This procedure also eliminates the need for the merchant/consumer to check Certification Revocation Lists (CRLs) for the validity of certificates. This process can be exhaustive, especially if the consumer uses devices with less processing power/restricted bandwidth, e.g., WAP phones.

The payment system according to the invention is adaptable to several account systems because of an API in the account manager. Further, the system assumes a multioperator environment, it is scalable, and the number of supported currencies is only limited by the operator's willingness to sign agreements with other operators.

Even though numerous characteristics and advantages of the present invention have been set forth in the foregoing description, together with details of the structure, it is to be understood that the disclosure is illustrative only, and changes may be made in detail within the principles of the invention indicated by the broad general meaning of the claims.

For example, in another embodiment of the invention the customer agent is a mobile phone communicating with a merchant over a mobile telephone network and/or a public switched network and/or an Internet Protocol network.

In another example, each client (merchant and consumers) has a relation with a trusted party, i.e., bank or other operator. This party may be a common party or two different parties, having a relation with each other, like international banks.

Each client and trusted party have software components installed, which support this feature.

A Public Key Infrastructure (PKI) is implemented, preferably organised and maintained by the trusted party. The merchant and consumer have access to each other's certificates.

In a usual trading situation, there are always at least two parties, i.e., a consumer and a merchant. In this example a new party is introduced, namely the trusted party. This party is however not any new actor in the field of trading. The role for the trusted party is to ensure that information sent between clients in the system is correct.

A transaction may take place when a consumer has received information about a product from a merchant. The information may contain whatever the merchant want. To support this feature, only a product identity and a product description are needed.

In this embodiment of the invention, a method for secure delivery of electronic goods, i.e., an electronic or digital product such as software or a computer program product etc., is described. The goods are delivered over a communications network such as the Internet.

Figure 4:
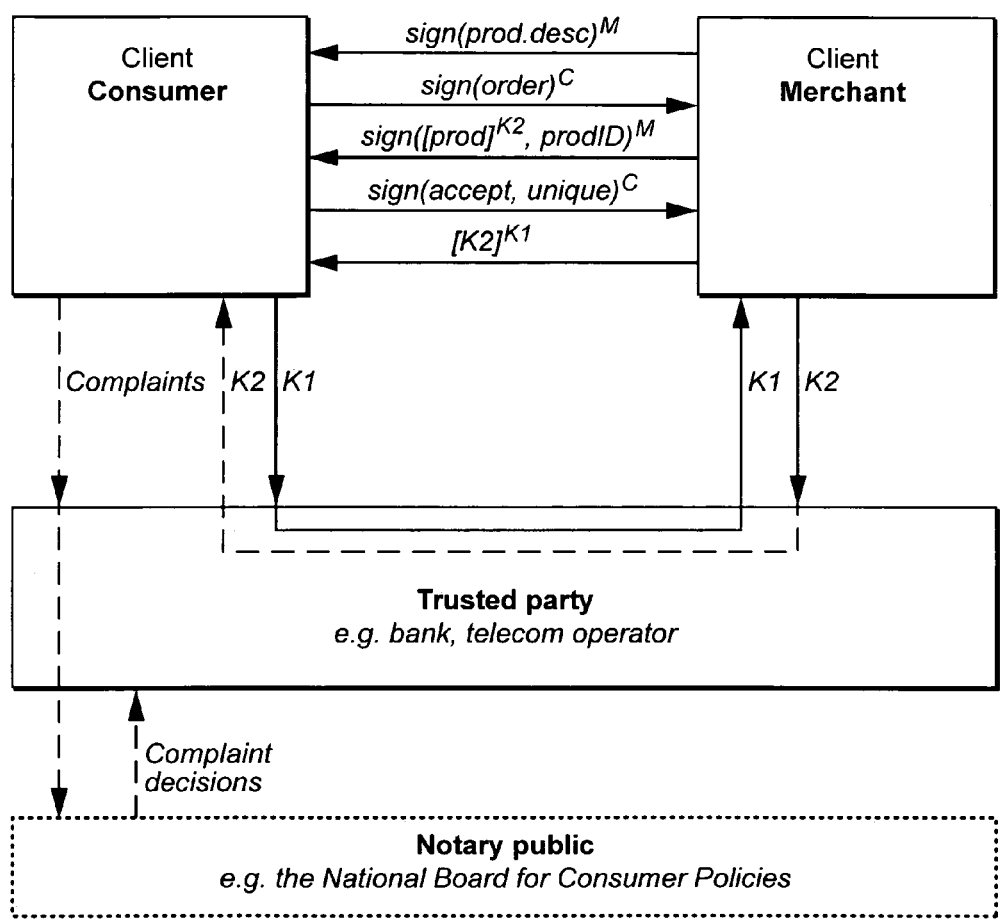
FIG. 4 is a block diagram showing a network configuration of an electronic payment system for use in electronic commerce, illustrating a method for secure delivery of electronic products over a communications network according to the invention.

With reference to FIG. 4, the consumer chooses a product, and initiates the purchasing process by sending a signed order to the merchant, which will be the evidence that the consumer really ordered the product (sign(order)C). The consumer will have to read and accept the product description before he orders a product. By accepting the order, the merchant acknowledges that the customer agrees to purchase the product as described in the initial product offer.

In parallel to the action above, the consumer will send a consumer generated ciphering key (K1) to the trusted party, which acts as an intermediary, signing it and passing it along to the merchant.

Upon reception of the signed order, the merchant can send the product to the consumer (sign([prod]$^{K2}$, prodID)$^M$). The complete package of the digital product and product identity is signed and sent to the consumer. This signature ensures the authenticity of the product, which is essential in the case of software to be installed on the consumer's hardware (HW). Furthermore, the digital product is sent ciphered with a key (K2) generated by the merchant. This means that the consumer can not open the content without the K2 key.

When the product package is received, the consumer client will do a check on received material in order to verify the correctness (transferring errors, wrong product, etc). The signatures of the product and product description will be checked so that they concern the same product. If they appear to be correct, the consumer sends an acknowledge to the merchant in a signed message (sign(accept, unique)$^C$) with a unique identifier time-stamped (to avoid reproducing problems). If the secure delivery is implemented together with an electronic payment scheme, the money is transferred to the merchant at this stage.

When the merchant receives the acceptance message from the consumer, it will initiate the last message in the procedure, which is the transfer of the ciphering key K2 to the consumer([K2]$^{K1}$). To avoid unauthorized access to the sent goods, the K2 key is ciphered with the consumer's K1 key.

Of course this is only the basic principle for a successful trading. A trading transaction can go wrong in several ways. First, the goods do not reach the consumer, due to bad connections, loss of packages, etc. At point 4, a check is done to evaluate the status of the received product. A re-sending can be ordered automatically. If the re-sending is not successful, the purchase is aborted. Without the (sign (accept, unique)$^C$) message from the consumer, the merchant can not claim payment for the product.

Second, the goods do not fulfill the consumer expectations. Normally, there are no realistic legal possibilities to revoke the purchase. However, with this system, the consumer has a big advantage, namely the merchant-signed product description. If the consumer's view is that the description does not give an accurate description of the received product, the consumer can escalate the controversy to (for example) the National Board for Consumer Policies (NBCP). The consumer sends the product (sign([prod]$^{K2}$, prodID)$^M$) and the product description (sign(prod.desc)$^M$) to the NBCP. The NBCP requests the key (K2) for decrypting the product from the trusted party. Since the product and the product description are signed and tied to each other by the product id, the consumer cannot send false information to the NBCP.

This solution solves one of the most annoying problems in the electronic commerce arena with fairly simple methods. It is easy to implement at the merchant site. All products may be pre-ciphered and pre-signed, and no real-time ciphering is needed. There is no need for unnecessary transportation via mediators (except for the cipher key K1 that is a very small transfer).

The use of a verbal product description is most likely acceptable as legal evidence in case of a dispute between the two trading parties. This also means that the system can handle all kinds of digital transfers, such as music, documents, movies, software etc. without any special treatment of the goods depending on its kind.

It is possible to implement the solution in many of today's electronic payment schemes.

The invention claimed is:

1. A method of payment of goods and services in an electronic commerce system, utilizing at least a customer agent and a merchant agent, at least one account manager associated with said agents for administration of customer accounts and merchant accounts, and at least a mediating trusted agent associated with one of said account managers and said merchant agent for checking purchases made by a customer from a merchant, said customer agent, merchant agent, account manager, and mediating trusted agent being interconnectable by a communications network, comprising:

said merchant agent receiving an order of goods or service from said customer agent;

a customer account manager receiving an initiation message sent from said customer agent, said message including data for registration of said customer agent and order information;

said customer account manager processing the initiation message, and in response to receiving the initiation message, providing said customer agent with account data during a trading session being established between said customer agent and said merchant agent over the network;

said customer account manager amending the initiation message with the account data and forwarding said amended initiation message to said mediating trusted agent for registration of said customer;

said customer account manager delivering a deposit to said mediating trusted agent;

said merchant agent receiving an information message including said deposit;

in response to reception of at least one purchase order from said customer agent, said merchant agent determining whether the value of said at least one purchase equals or exceeds the value of the deposit received in the information message; and when the value of at least one purchase equals or exceeds the value of the deposit, stopping the trading session, wherein said initiation message includes an amount of the deposit, a transaction identity, the identity of the merchant, and an identity for locating a mediating trusted agent, wherein said initiation message includes the deposit, a customer identifier, said transaction identity, and the identity of the merchant, and wherein said information message includes the deposit, a trading session identity, and said customer identifier.

2. A method according to claim 1, wherein a plurality of purchase orders is executed within limit of said deposit.

3. A method according to claim 1, wherein the identity for locating a proper mediating trusted agent is of the merchant's operator.

4. A method according to claim 1, wherein the deposit in the initiation message is in the customer currency.

5. A method according to claim 1, wherein the deposit in the information message is in the currency of the merchant, a trading session identity, and said customer identifier.

6. A method according to claim 1, wherein after the step of said mediating trusted agent sends an information message, said merchant acknowledges the customer and the associated deposit to said mediating trusted agent.

7. A method according to claim 6, further comprising:
   said mediating trusted agent acknowledging the customer and the associated deposit to said customer account manager.

8. A method according to claim 7, wherein said acknowledging includes the current exchange rate and that said customer account manager forwards said exchange rate to the customer agent.

9. A method according to claim 1, wherein said customer account manager amending and forwarding said initiation message to said mediating trusted agent includes vouching for the customer.

10. A method according to claim 1, wherein stopping the trading session includes said merchant agent receiving a trading session terminate message sent by said customer agent or a timeout.

11. A method according to claim 10, further comprising:
    said customer account manager sending a customer transaction record to said mediating trusted agent;

said merchant agent sending a merchant transaction record to the mediating trusted agent;
said mediating trusted agent comparing and evaluating said transaction records, resulting in clearing information;
said mediating trusted agent sending said clearing information to said customer account manager and a merchant account manager,
said customer account manager and a merchant account manager respectively sending said clearing information to said customer and said merchant, and based on said clearing information, processing said transaction records to a withdrawal record and a deposit record, respectively, storing the transaction records, and sending said withdrawal record to a customer billing system and said deposit record to a merchant billing system, respectively.

12. A method according to claim 1, wherein the trading session is stopped based on an instruction from said customer agent or merchant agent.

13. A payment system for use in an electronic commerce system, comprising a customer agent, a merchant agent, an account manager associated with said agents for administration of customer accounts and merchant accounts, and mediating trusted agent associated with one of said account manager and merchant agent for checking purchases made by a customer from a merchant, said customer agent and merchant agent, said account manager, and said mediating trusted agent being interconnectable by a communication network,
wherein said merchant agent is adapted to receive an order of goods or service from said customer agent,
said customer account manager is adapted to receive an initiation message sent from said customer agent, said message including data for registration of said customer agent and order information, said customer account manager being adapted to process the initiation message, and in response to receiving the initiation message, to provide said customer agent with account data during a trading session being established between said customer agent and said merchant agent over the network;
said customer account manager is adapted to amend the initiation message with the account data and forward said amended initiation message to said mediating trusted agent for registration of said customer, and to deliver a deposit to said mediating trust agent;
said merchant agent is adapted to receive an information message including said deposit;
in response to reception of at least one purchase order from said customer agent, said merchant agent is adapted to determine whether the value of said at least one purchase equals or exceeds the value of the deposit received in the information message; and
one or both of said merchant agent and customer agent is adapted to stop the trading session when the value of at least one purchase equals or exceeds the value of the deposit,
wherein said initiation message includes an amount of the deposit, a transaction identity, the identity of the merchant, and an identity for locating a proper mediating trusted agent,
wherein said amended initiation message includes the deposit, a customer identifier, said transaction identity, and the identity of the merchant, and
wherein said information message includes the deposit, a trading session identity, and said customer identifier.

14. A payment system according to claim 13, wherein said account manager and said mediating trusted agent are separate modules.

15. A payment system according to claim 13, wherein a plurality of transactions is executable within the limit of said deposit.

16. A payment system according to claim 13, wherein said initiation message includes the identity of the merchant's operator for locating a mediating trusted agent.

17. A payment system according to claim 13, wherein said initiation message includes the deposit in the customer currency.

18. A payment system according to claim 13, wherein said information message includes the deposit in the currency of the merchant.

19. A payment system according to claim 13, wherein said merchant agent is adapted to acknowledge the customer and the associated deposit to said mediating trusted agent.

20. A payment system according to claim 19, wherein said mediating trusted agent is adapted to acknowledge the customer and the associated deposit to said customer account manager.

21. A payment system according to claim 20, wherein said acknowledgement includes the current exchange rate, and wherein said customer account manager is adapted to forward said current exchange rate to the customer agent.

22. A payment system according to claim 13, wherein said customer account manager is adapted to vouch for the customer.

23. A payment system according to claim 13, wherein said merchant agent is adapted to receive a trading session terminate message sent by said customer agent.

24. A payment system according to claim 13, wherein said customer account manager is adapted to receive a customer transaction record sent by said customer agent;
said customer account manager is adapted to send said customer transaction record to said mediating trusted agent;
said merchant is adapted to send a merchant transaction record to the mediating trusted agent;
said mediating trusted agent is adapted to compare and evaluate said customer and merchant transaction records and generate clearing information;
said mediating trusted agent is adapted to send said clearing information to said customer account manager and a merchant account manager connected to said mediating trusted agent via said network;
said customer account manager and a merchant account manager are adapted to send said clearing information to said customer and said merchant, respectively;
based on said clearing information, said customer account manager is adapted to process said transaction records to a withdrawal record, store the transaction records, and send said withdrawal record to a customer billing system; and
based on said merchant clearing information, said account manager is adapted to process said transaction records to a deposit record, store the transaction records, and send said deposit record to a merchant billing system.

25. A payment system according to claim 13, wherein one or both said merchant agent and customer agent is adapted to stop the trading session by its own initiative.

* * * * *